Patented May 11, 1954

2,678,297

UNITED STATES PATENT OFFICE 2,678,297

PREPARATION OF VITAMIN B$_{12}$ CONCENTRATES

Jerry Robert Daniel McCormick, Pearl River, N. Y., and Siegfried Arthur Muller, Dumont, N. J., assignors to American Cyanamid Company, New York, N. Y., a corporation of Maine No Drawing. Application February 16, 1951, Serial No. 211,443

9 Claims. (Cl. 167—81)

This invention relates to the preparation of vitamin extracts and is particularly concerned with the concentration and purification of vitamin B12 and those related substances having a similar physiological activity.

For many years aqueous extracts of liver have been used in medicine for their anti-pernicious anemia effects. Various methods of purifying these extracts and increasing their anti-anemia activity have been proposed. Recently it has been shown that the most effective constituent of liver extract in treating pernicious anemia is a vitamin substance now known as vitamin B12. This substance is a cyanocobalt coordination complex. Other substances have also been isolated from liver and other natural sources and are believed to possess a structure closely related to vitamin B12. For example, vitamin B12b has a hydroxyl radical in place of the cyano group of vitamin B12 but it otherwise appears to be the same. Physiologically-active conjugates of these substances undoubtedly exist in natural sources. Vitamin B12 has been modified by chemical treatment and the product found to possess physiological activity. The term "cobalamins" has been proposed for these cobalt-containing vitamin substances and the term is used herein to indicate the several different naturally-occurring vitamin substances which may be treated by the process of the present invention.

In addition to liver and other naturally-occurring products, it has been found that the cobalamins are found in fermentation liquors of a wide variety of micro-organisms, including bacteria, yeasts and fungi. For example, Petty, U. S. Patent 2,515,135, July 11, 1950, discovered that bacteria of the genus Flavobacterium produce growth promoting factors which include one or more of the cobalamins. Others have shown that vitamin B12 is formed by *Streptomyces griseus* during the production of streptomycin. Vitamin B12 and vitamin B12b are produced by *Streptomyces aureofaciens*. (Pierce et al., J. Am. Chem. Soc., vol. 71, p. 2952, 1949.) Still other micro-organisms which have been found to produce the physiologically-active cobalamins include *Bacillus megatherium*, *Streptomyces rimosus*, *Clostridium butyricum*, *Eremothecium ashybii* and many others. Since liver extracts are comparatively expensive, limited in quantity and cannot provide all of the vitamin B12 potentially demanded, other sources of supply are desirable. The fermentation processes referred to are conducted on a large scale for the production of valuable antibiotics and other products and provide an important and practical source of the valuable cobalamins which can be made available by the process of the present invention.

Unfortunately, vitamin B12 occurs in the fermentation liquors as well as in liver extracts in extremely minute amounts of the order of a fraction of one microgram per milliliter. Obviously processes of economically obtaining the vitamin substance from such liquors are extremely difficult and require the use of large volumes of expensive and often hazardous solvents to obtain commercially useful quantities of the vitamins. One of the objects of the present invention is to improve presently known processes of extracting the anti-pernicious anemia principal, cobalamins, vitamin B12, or whatever designation these may most properly be given, from solutions containing the same. The process of the present invention about to be described makes it possible to use much smaller volumes of less hazardous solvents while at the same time obtaining higher yields of the desired product. These advantages make it possible to use smaller vessels and reduce the solvent recovery problem that is encountered in commercial operations. These advantages, and others which will be apparent to those skilled in the art, make it possible to produce unlimited quantities of valuable vitamin substances from what might otherwise be waste products so that these vitamins can be sold at a very low price, making them more widely available for human therapy, as well as their profitable use in the enrichment of animal feeds for their growth promoting qualities.

Phenols and alkyl phenols have been used to concentrate liver extracts to enrich the anti-pernicious anemia principal therein, which is now believed to be due in large part to the vitamin B12 normally present. Note U. S. Patent 2,134,256. In this process, the vitamin B12 is recovered from the phenolic solution by precipitation when the phenolic solution is diluted with a solvent such as ether or chloroform. (Note Example 1.) The vitamin B12 may also be recovered from the phenol by extraction with water after the phenol has been treated with a phenol-soluble water-soluble organic substance such as benzene, chloroform, carbontetrachloride, petroleum ether and the like which tend to depress the solubility of the vitamins in the phenol. However, this process requires large volumes of these solvents, many of which are hazardous and not suitable for large scale operations.

In accordance with the present invention, we have discovered that the process of extracting vitamin B12 substances from aqueous solutions containing the same can be improved to a remarkable extent by the new procedure about to be described. In our process, an aqueous solution containing the cobalamins is first extracted with a phenol. The phenolic phase is then treated with a molar equivalent of an organic base, which forms a complex with the phenol and depresses the solubility of vitamin B12 therein to a very marked extent. Vitamin B12 is then readily extracted from the phenolic phase with water.

Among the phenols that may be used in the present process include phenol; the alkyl phenols; such as cresol, xylenol, amyl phenol and normal octyl phenol; the halo phenols, such as p-chloro phenol; p-nitro phenol; the acyl phenols, such as p-hydroxyacetophenone and p-hydroxybenzaldehyde; phenolic carboxylic acid esters, such as p-hydroxybenzoic acid ethyl ester; phenolic ethers, as hydroquinone monomethyl ether, and various others. Solid phenols may be used in the process by using increased temperatures or by diluting the phenol with an inert solvent in which vitamin B12 is insoluble. A representative system would be p-tertiary butyl phenol liquified with butanol. Obviously, water-soluble phenols as pyrogallol should not be used, as the process contemplates the use of water in recovering vitamin B12 from the phenolic complex. Chelated phenols such as methyl salicylate, are not desirable in the process.

The organic bases which have been found to be effective in the process of the present invention are those which form water insoluble complexes with phenols and are most commonly secondary and tertiary amines. Among the most effective amines of this class include pyridine, 2,4-lutidine, triethyl amine, 2-ethylhexylamine, mono-butyl-amine, ethylmorpholine, dimethylaniline, commercial mixed collidines and various others. These bases vary considerably in their power to depress the solubility of vitamin B12 in phenols and the choice of a particular organic base will vary with such factors as relative cost, availability, toxicity, physical form, nature of the phenol, basicity and the like. Obviously, since the process involves the extraction of the phenolic complex with water, the organic base that is selected for use in the process will not include those that form water-miscible complexes with phenols. Among these may be mentioned ethanolamine and the lower alkylamines such as methyl and ethylamines. Since the formation of the phenolic complex is quite simple and as the relative water immiscibility of the complex can be determined with practically no experimentation, the choice of operable bases for use in the process can be readily determined by one skilled in the art without further explanation.

The particular water immiscible phenolic-amine complex that is chosen should have a distribution coefficient in water of 0.3 or better with respect to vitamin B12. In other words the factor $$\frac{Cw}{Cp}$$

in which $Cw$ represents the concentrations of B12 in water and $Cp$ represents the concentration of the B12 in the phenolic phase should be 0.3 or more. To illustrate the wide range of the distribution coefficients that exist, the factor $$\frac{Cw}{Cp}$$

may vary from 0.3 in the case of dimethyl aniline to over 100 in the case of 2.4-lutidine, ethylmorpholine rates about one, 2-ethylhexylamine about 2, triethylamine about 6 and pyridine has a distribution coefficient of approximately 80 with respect to p-chlorophenol.

In carrying out the process of the present invention an aqueous solution containing vitamin B12 is first extracted by known means with a phenol of the kind mentioned hereinabove. The aqueous solution may contain from 0.05 gamma per milliliter up to 50 gammas per milliliter and more. The volume of the phenolic solution may vary from about 0.01 to one volume of the phenol for each volume of the aqueous phase. The extraction may be a mere mixing together of the two immiscible solutions as stirring in a vessel or may be a more elaborate countercurrent column extraction or other known method of extracting one liquid with another to transfer a soluble constituent therein. The aqueous solution may be an aqueous extract of liver or other naturally occurring substance in which vitamin B12 is present or it may be a fermentation broth containing the same. These liquors may be first treated to remove inert substances or valuable antibiotics or physical means to increase the content of vitamin B12 or to release it so that it may be extracted more readily. Such techniques are known to those skilled in the art and need not be elaborated upon as they are not an essential part of the present invention.

The phenolic extract which is obtained should contain at least about 0.1 gamma per milliliter of vitamin B12. The solution may contain as much as 50 gammas or more of vitamin B12 per milliliter. The temperature of the system may vary from 0° C. to 80° C. or higher depending upon the particular phenol employed and other conditions. It is known that vitamin B12 will decompose in phenols at high temperatures and, preferably, the process is carried out within the range 0° C. to 40° C.

As noted above, the amount of amine used is approximately 1 molar equivalent based on the phenol. In some cases, however, 2 moles of the phenol will form a complex with 1 mol of amine and less of the amine may be used. The formation of such complexes is described in the literature and reference may be had thereto for further details.

After formation of the phenolic-amine complex by addition of one of the amines just described, the solution is then extracted with water. Because the solubility of the vitamin B12 in the phenol has been depressed as a result of formation of the complex, a smaller volume of water may be employed. In the case of 2,4-lutidine approximately 1% by volume of water will extract most of the vitamin B12 in a five stage countercurrent extraction system. Generally we prefer to use between 10 and 25% by volume of water in a 2 or 3 stage countercurrent extraction system. When using parachlorophenol as the preferred phenol and a mixture of commercial amines containing 30% beta picoline, 30% gamma picoline and 30% mixed lutidines, we would use for example 25% by volume of water at a temperature of 10° C. and a three stage countercurrent extraction system. When using other phenols and other amines the volume will vary within the ranges set forth above. Obviously these factors that may be determined by one skilled in the art for each particular condition that may be encountered in commercial operations.

The invention will now be illustrated by means of a few examples in which particular solvents are employed to extract the vitamin B12 activity from aqueous solutions. In most of these solutions the vitamin B12 activity occurs in the form of a mixture of the several naturally occurring modifications of this substance. The process is applicable to the extraction of a single entity of this group or a mixture with equal facility. It will be understood that the invention is not limited to these particular solvents or conditions as these represent only presently preferred procedures. As noted above various modifications can be made in the above process to suit particular conditions that may prevail.

Example 1

A quantity of aureomycin fermentation liquor containing 0.4 gamma of vitamin B12 activity per milliliter was adjusted to a pH of 8.5 and filtered. Eight liters of this filtrate were extracted twice with two 400 ml. portions of liquified parachlorophenol. The combined extracts assay 2.3 gammas of B12 per ml.

A 5 ml. portion of the above extract was shaken with 6 ml. of water and 6 ml. of 2,4-lutidine. The resultant aqueous phase assayed 2.6 gammas of B12 per ml. The phenolic phase contained less than 0.025 gamma per ml.

Example 2

Another 5 ml. portion of the phenolic extract of Example 1 was shaken with 6 ml. of water and 4.5 ml. of pyridine. The resultant aqueous phase assayed 2.1 gammas of B12 per ml. and the solvent phase, less than 0.025 gamma per ml.

Example 3

A 1 ml. portion of a similar phenolic extract, assaying 3.7 gammas of B12 per ml., was shaken with 5 ml. of water and 1 ml. of triethylamine. The resultant aqueous phase assayed 0.8 gamma per ml.

Example 4

To one ml. of a solution of parachlorophenol assaying 3.7 gammas of B12 ml. was added 5 ml. of water and one ml. of triethylamine. The mixture was shaken and then centrifuged. The supernatant aqueous phase assayed 0.77 gamma of B12 per ml.

Example 5

To 10 parts by volume of a pink aqueous solution assaying 41 gammas per ml. of B12 was added two parts by volume of molten 2-chloro-5-hydroxy toluene and the mixture was shaken vigorously. The colorless aqueous phase from which the B12 had been extracted was separated and discarded. The red phenolic phase was shaken with 10 parts by volume of water and two parts by volume of 2-methyl-5-ethyl pyridine. The aqueous phase that was recovered was of approximately the same color as the starting solution indicating that practically all of the B12 was recovered as a result of the extraction procedure.

Example 6

A 50 ml. portion of an aureomycin waste liquor concentrate assaying 1.3 gammas of vitamin B12 per ml. was extracted with two 3 ml. portions of liquified parachlorophenol. To 5 ml. of the phenolic extraction assaying 8.7 gammas of B12 per ml. was added 5 ml. of pyridine and 5 ml. of water. The whole was shaken and centrifuged. The separated aqueous layer assaying 8.5 gammas per ml.

Example 7

To 5 parts by volume of a pink aqueous solution assaying 41 gammas per ml. of vitamin B12 was added one part by volume of molten paranitrophenol and the mixture shaken while warm. The spent aqueous phase assayed 4.7 gammas per ml. of B12. The phenolic phase was recovered and shaken with 40 parts by volume of water and one part by volume of aniline. The aqueous phase which was recovered assayed 4.4 gammas of B12 per ml.

Example 8

A quantity of aureomycin fermentation liquor, containing 15% sodium chloride, from which the aureomycin had been removed by extraction with butanol was brought into interfacial contact with parachlorophenol and the phenolic phase then separated. Five parts by volume of the parachlorophenol extract was dried by vacuum distillation and was found by microbiological assay to contain 2,300 gammas of B12 activity per liter. To this was added 5.5 part by volume of 2,4-lutidine. The precipitate that formed was centrifuged and then slurried with 5 parts by volume of 0.1 N HCl then centrifuged again. The aqueous supernatant assayed 2.3 gammas of B12 per ml.

The aqueous solution obtained in the above examples may be dried and incorporated in pharmaceutical preparations intended for oral administration or they may be mixed with animal feeds and dried for use in promoting the growth of animals. If desired, the aqueous solutions may be further treated to purify them to a degree suitable for parenteral administration by methods known to those skilled in the art.

What we claim is:

1. The method which comprises the step of adding to a solution of vitamin B12 in a water insoluble phenol an amine of the group consisting of primary and secondary amines capable of forming a water immiscible complex with said phenol whereby a phenolic-amine complex is formed and the solubility of the vitamin B12 therein is reduced and thereafter extracting the solution with water and separating the resulting aqueous phase containing vitamin B12.

2. The method which comprises the step of adding to a solution of vitamin B12 in parachlorophenol a molar equivalent of 2,4-lutidine based upon the parachlorophenol and thereafter extracting the solution with water and separting the resulting aqueous phase containing vitamin B12.

3. The method which comprises the step of adding to a solution of vitamin B12 in a water insoluble phenol a mixture of alkyl pyridines capable of forming a water-immiscible complex with said phenol and thereafter extracting said solution with water, and recovering the aqueous phase containing vitamin B12.

4. A process which comprises the steps of treating by interfacial contact an aqueous solution containing cobalamins with a water-insoluble liquid phenol, separating the phenolic phase from the aqueous phase, adding to the phenolic solution an amine capable of forming a water immiscible phenol-amine complex with said phenol in sufficient amounts to form a complex therewith and depress the solubility of said cobalamins in said phenol, mixing the resulting solution with water and thereafter recovering the aqueous phase containing the cobalamins dissolved therein.

5. A process in accordance with claim 4 in which the phenol is parachlorophenol.

6. A process in accordance with claim 4 in which the phenol is an alkyl phenol.

7. A process in accordance with claim 4 in which the amine is an alkyl pyridine.

8. A process in accordance with claim 4 in which the amine is triethyl amine.

9. A process of purifying and concentrating aqueous solutions containing vitamin B12 which comprises the steps of bringing into interfacial contact an aqueous solution containing from about 0.05 gamma to 50 gammas per ml. of vitamin B12 and from about 0.01 part by volume to 1 part by volume of parachlorophenol, separating the two phases and recovering the phenolic phase, adding to said phenolic solution a molar equivalent of an alkyl pyridine based on the quantity of parachlorophenyl present and thereafter treating said mixture with water to obtain an aqueous solution containing vitamin B12 in a purified and concentrated form.

References Cited in the file of this patent

UNITED STATES PATENTS

| Number | Name | Date |
|---|---|---|
| 2,134,256 | Laland | Oct. 25, 1938 |
| 2,530,416 | Wolf | Nov. 21, 1950 |
| 2,563,794 | Rickes | Aug. 7, 1951 |

FOREIGN PATENTS

| Number | Country | Date |
|---|---|---|
| 469,430 | Great Britain | July 26, 1937 |
| 473,064 | Great Britain | Oct. 5, 1937 |

OTHER REFERENCES

Rickes: Science, vol. 107, April 16, 1948, pages 396, 397.

Rickes: Science, vol. 108, December 3, 1948, pages 634, 635.

Kaczka: Science, vol. 112, September 29, 1950, pages 354, 355.